3,375,910
ACTUATING ASSEMBLY FOR FRICTION DEVICE
Leo W. Cook, Royal Oak, Mich., assignor to Borg-Warner Corporation, Chicago, Ill., a corporation of Illinois
Filed Dec. 30, 1965, Ser. No. 517,579
4 Claims. (Cl. 192—99)

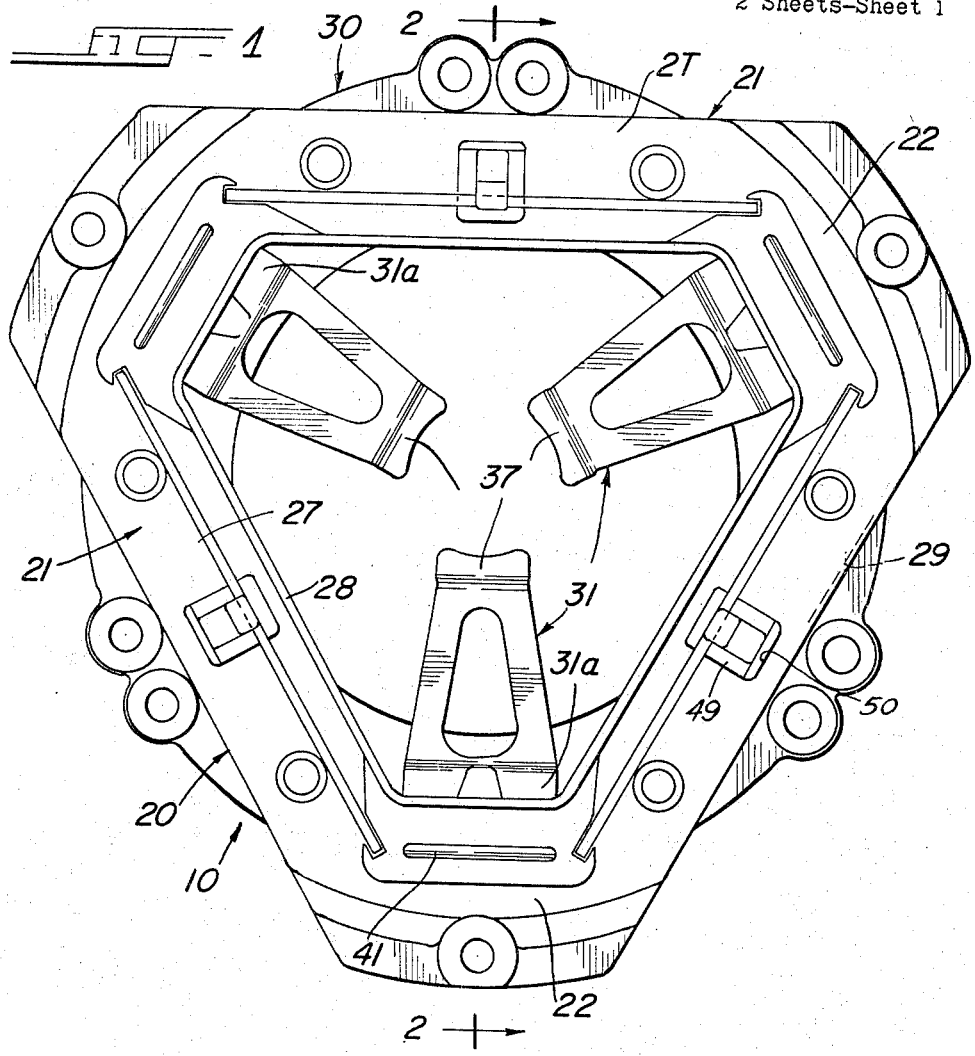

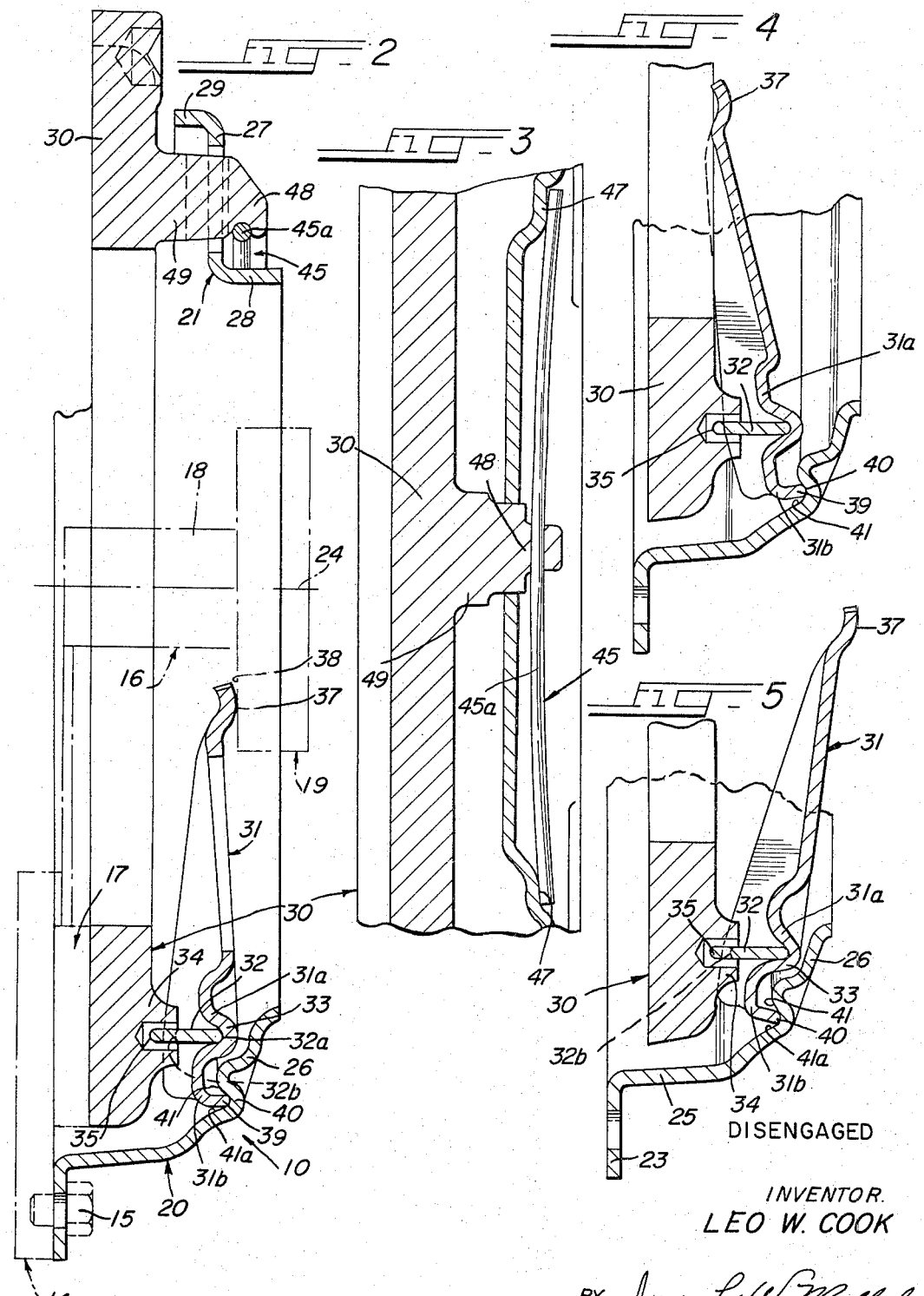

ABSTRACT OF THE DISCLOSURE

A plurality of clutch release levers mounted with their respective outer ends in a stamped recess inside a cover plate provide means to anchor the levers against centrifugal forces and means to establish rolling contact upon pivotal movement between the lever and the cover plate. This abstract is made to comply with rule 72(b) and is not to be used in interpreting the scope of the claims.

---

This invention relates to friction devices and more particularly to an actuating assembly for a friction device of the remote engaging-spring type.

The invention is a specific improvement over that disclosed and claimed in U.S. Patent 2,253,344, commonly assigned to the assignee of this invention. In the above patent, levers or force transmitting means are used to urge a pressure plate relative to a reaction or cover plate; the levers are mounted for pivotal movement on a knife edge of an opening defined in the cover plate and have shoulders engaging margins of the opening to retain the levers against centrifugal forces. The disadvantage of a knife-edge fulcrum is the likelihood that the fulcrum will deteriorate under the concentrated stress that it must withstand.

It is therefore a primary object of this invention to provide a lever system for a clutch of the type utilizing a remote spring (the engaging force being conveyed by a suitable linkage to the actuating assembly) which is improved by utilizing rolling or cylindrical bearing surfaces between all of the contacts of each of the levers and thereby promoting longer life and durability.

Another object of this invention is to provide a lever system for a remote spring type clutch which is particularly characterized by each lever having an outer end effective to be directly and bearingly received by a rear wall portion of a sheet metal cover plate, the rear wall portion being biased with respect to the plane of rotation of the clutch thereby resisting deflection under bearing load of the levers.

Still another object of this invention is to provide a novel retraction or release means which normally biases the pressure element towards the cover plate, said biasing means being particularly characterized by a plurality of elongated strands each having opposite ends restrained by the cover plate and an intermediate portion interconnected with the pressure plate for urging retraction.

Other objects and advantages of this invention will become more apparent from the following detailed description taken in connection with the accompanying drawings in which:

FIGURE 1 is a general plan view of an actuating assembly for a remote spring type clutch and embodying the principles of this invention;

FIGURE 2 is an enlarged section view taken substantially along line 2—2 of FIGURE 1 and illustrating the lever system in the engaged position of operation;

FIGURE 3 is an enlarged sectional view illustrating the biasing means for retracting the pressure plate; and FIGURES 4 and 5, illustrate different conditions of the levers with respect to the assembly.

Referring now to the drawings and more particularly to FIGURES 1 and 2, actuating assembly 10 of the present invention is adapted to be used with other elements of a clutch device which are more specifically disclosed in copending U.S. application Ser. No. 312,092, now abandoned certain portions of which are schematically illustrated herein. The actuating assembly may be carried by a driving input flywheel 14 of the flat face type; the assembly is connected to the flywheel at peripheral portions by suitable circumferentially spaced fasteners 15. A driven means 16 is employed and may comprise a typical friction disc cltuch plate 17 drivingly splined for rotation with a driven shaft 18 extending outwardly through the cover assembly. A thrust bearing assembly 19 is mounted about the driven shaft and adapted for reciprocal movement thereon to effect operation of the actuating assembly.

More particularly, the actuating assembly 10 comprises a cover plate 20 formed of sheet metal which, in the plan view, is generally triangular shaped having generally elongated web portions 21 interconnected at mounting stations 22, each of the stations having a flange 23 lying parallel to the plane of rotation of the actuating assembly about a central axis 24; the stations further comprise a wall 25 extending rearwardly (to the right as viewed in FIGURE 2) and has an integral rear wall portion 26 biased with respect to the plane of rotation of the clutch device. The web portions 21 each comprise a generally flat web 27 having inner and outer marginal lips 28 and 29.

The actuating assembly further comprises a pressure element or plate 30 of annular configuration, as shown in FIGURE 1, the pressure element being drivingly carried by the cover plate 20 through the use of suitable drive lugs 49 or engaging rectangular openings 50 in covering other attaching means. At the same time, the pressure element is adapted for axial movement to and from the reaction element or plate for effecting clutch engagement and disengagement. To this end, a mechanical force transmitting means is employed comprising a plurality of circumferentially spaced and radially directed levers 31, each formed from sheet metal. Each of the levers has an intermediate portion 31a which is interconnected with the pressure element by way of a strut 32. Each strut has opposite or opposed cylindrical edges 32a and 32b; edge 32a being rockable received within a coined cylindrical surface or seat 33 of the intermediate portion of the lever and opposite edge 32b adapted to bear against a flat surface of shoulders 34 formed at spaced circumferential points on the pressure plate. An intermediate portion of each strut is provided with a nose 35 adapted to extend into openings formed in each shoulder 34 for effecting a general radial retention of the struts. The inner end of each lever is provided with a cylindrical surface 37 for engaging a flat surface 38 of the thrust bearing means. The outer end 31b of each lever has an integrally formed flange 39 provided with a rounded edge 40 adapted to be received by a cylindrically stamped or coined surface 41 on the interior of the cover plate rear wall portion. In the preferred embodiment, the sheet metal rear wall portion 26 is given a convolution to define a hollow seat carrying surface 41. Such seat also has another side 41a thereof effective to restrain the outer end of each lever against centrifugal forces.

The levers are loosely assembled between the respective cover and pressure elements and thrust bearing assembly 19 maintained in such assembled condition by a biasing means 45 comprising a plurality of chordally disposed elongated strands 45a, each of the strands being resilient in nature and having opposite ends bearing against shoulders 47 deformed in the web portions 21 of the cover plate. Intermediate portions of each strand 46 engage a hooked portion 48 defined on rearwardly extending bosses 49 of the pressure plate 30. In the assembled condition, the strands are bendably stressed so as to maintain a normal resilient bias withdrawing the pressure plate 30 to a disengaged condition as shown in FIGURE 5.

In operation of the remote spring type clutch and actuating assembly shown herein, the thrust bearing assembly 19 is moved to the left as viewed in FIGURE 2, to effect pivotal movement of the plurality of levers 31 about the fulcrum defined by the outer ends 31b and cover plate seats 41. Such pivotal movement urges the intermediate portions 31a of each of the levers toward the pressure plate and thereby moves the pressure plate 30 into engagement with the friction disc. Disengagement is provided by release of the remote engaging force from the thrust bearing assembly 19 thereby permitting the biasing means 45 to withdraw the pressure plate to the right and thereby bring the levers to the position as shown in FIGURE 5. During all such conditions the outer end of each of the lever is directly received by the cover plate in a bearing manner between cylindrical surfaces thereof.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:

1. An actuating assembly for use with a spring type clutch device, comprising: a reaction member rotatable about an axis thereof, a pressure element rotatably driven by said reaction element, and mechanical force transmitting means interposed between said reaction element and pressure element effective to be pivotally moved for urging said pressure element axially with respect to said reaction element for promoting a clutch engaging condition, said force transmitting means particularly comprising at least one lever carried by said reaction element, said reaction element including a rear wall portion provided with at least one internal cylindrical surface, said lever having an outer end provided with a transverse cylindrical surface effective to engage said cylindrical surface of said reaction element to provide a bearing connection therebetween, said cylindrical surface of said reaction element receiving said lever outer end in a manner to restrain said lever against outer radial movement due to said centrifugal forces while still permitting said pivotal movement of said lever.

2. An actuating assembly as in claim 1, in which said force transmitting means comprises a plurality of radially disposed levers each having an outer end provided with an integral portion offset from the body of said lever for contacting said reaction element.

3. An actuating assembly as in claim 1, in which said force transmitting means includes a strut interposed between the lever and said pressure element for providing an interconnection therebetween, and means provided on said lever and said pressure plate for receiving opposite edges of said strut to provide for rocking movement.

4. An actuating assembly as in claim 1, in which said pressure plate is provided with circumferentially spaced bosses, and said reaction element carries resilient generally straight strands effective to engage with said bosses for biasing the pressure element toward said reaction element, the resilient strands having spaced portions thereof restrained by said pressure element.

References Cited

UNITED STATES PATENTS

| 2,296,538 | 9/1942 | Reed | 192—68 |
| 3,167,163 | 1/1965 | Smirl et al. | 192—68 |

FOREIGN PATENTS

| 1,162,202 | 4/1958 | France. |

ROBERT M. WALKER, *Primary Examiner.*

ARTHUR T. McKEON, *Examiner.*